(No Model.)
E. SAMUEL.
DRIVING GEAR FOR CARS.
No. 412,298. Patented Oct. 8, 1889.
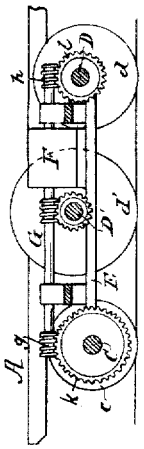
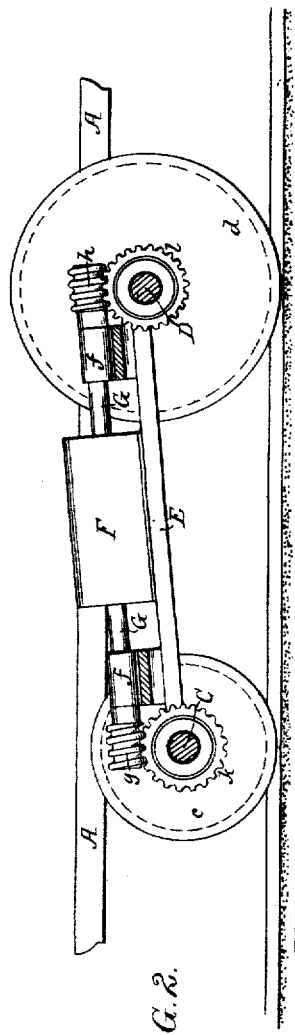
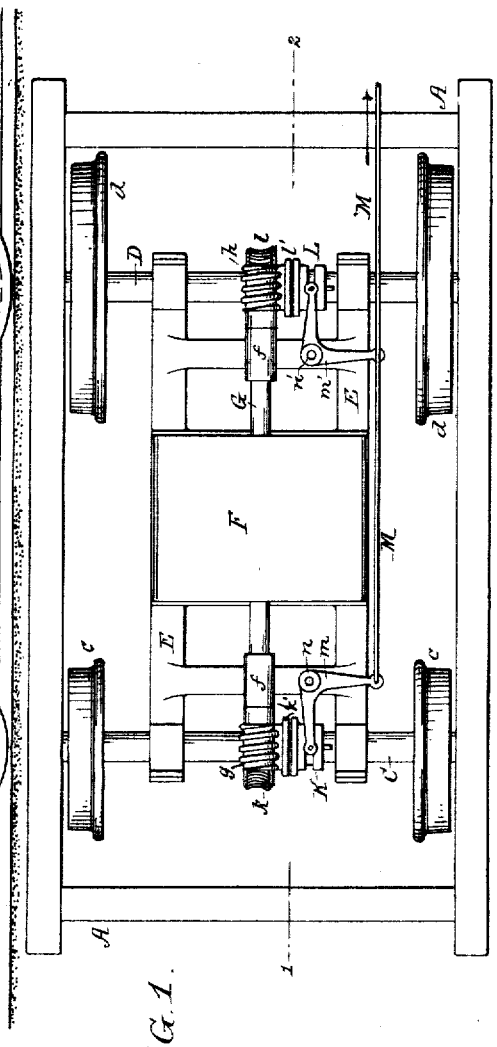
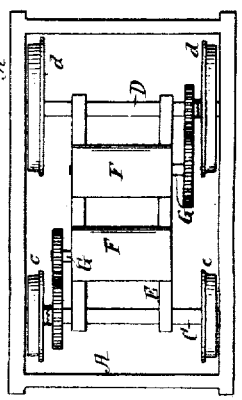
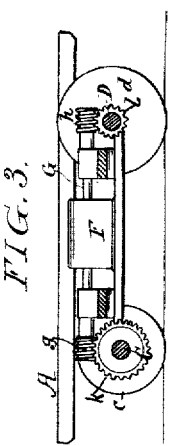
Witnesses:
John J. Leary
A. D. Groupe
Inventor:
Edward Samuel
by his Attorneys
Howson & Howson United States Patent Office.

EDWARD SAMUEL, OF PHILADELPHIA, PENNSYLVANIA.

DRIVING-GEAR FOR CARS.

SPECIFICATION forming part of Letters Patent No. 412,298, dated October 8, 1889.

Application filed June 10, 1889. Serial No. 313,715. (No model.)

*To all whom it may concern:*

Be it known that I, EDWARD SAMUEL, a citizen of the United States, and a resident of Philadelphia, Pennsylvania, have invented certain Improvements in Driving-Gear for Motor-Driven Cars, of which the following is a specification.

The object of my invention is to provide for varying the rate of propulsion of a motor-driven car without varying the speed of the prime mover or motor.

In the accompanying drawings, Figure 1 is a plan view of the truck of a car with motor and driving-gear in accordance with my invention. Fig. 2 is a section on the line 1 2, Fig. 1; and Figs. 3, 4, and 5 are views illustrating other methods of carrying out my invention.

It is an advantage in using electric motors, especially for the motive power of city passenger railway-cars, to have the motor run at its maximum speed and to control the speed of the car without any change in the speed of the motor, as the motor develops its highest efficiency when running at maximum speed. It is also advisable in starting the car or in mounting grades to utilize the maximum power of the motor regardless of the speed; and, on the other hand, it is advisable to obtain the maximum amount of speed on level roadways, where the propulsion of the car does not require the same amount of power as is required in starting the car or climbing grades. I therefore provide the axles of the car with traction-wheels of different diameters—that is to say, those of one axle are of different diameters from those of the other axle or axles—so that with a constant speed of the motor-shaft a varying rate of propulsion of the car and a varying degree of power for such propulsion are possible.

In the drawings, A represents the frame of the car-truck, constructed in any suitable manner, and having journal-boxes for the axles C and D.

Referring to Figs. 1 and 2, it will be noticed that the wheels $c\ c$ on the axle C are less in diameter than the wheels $d\ d$ on the axle D, and either one of the axles C D can be driven independently of the other, so that if the motor F is driven at a uniform speed and the axle C is geared to said motor it will propel the car at one rate of speed; but if the axle D is geared to the motor the speed of the car will be increased without any variation in the speed of the motor.

There are many forms of gearing by which the motor can be geared to either shaft, and I have shown in the drawings worm-gears for the purpose; but it will be understood that this form of gearing need not be adhered to.

The motor F is mounted on a supporting-frame E, hung to the axles C D in any suitable manner, although the motor may be suspended by any suitable support from the body of the car or truck. The motor-shaft G has at each end worms $g$ and $h$, and is supported by suitable bearings $f\ f$. The worm $g$ meshes with a worm-wheel $k$, loose on the shaft C, and the worm $h$ meshes with a worm-wheel $l$, loose on the shaft D.

On the hub of the worm-wheel $k$ are friction-clutches $k'$, which engage with like clutches $k$, adapted to turn with but slide on the axle C, and the hub of the worm-wheel $l$ is also provided with a friction-clutch $l'$, which engages with a friction-clutch L, splined on the axle D. Two bell-crank levers $m\ m'$ are pivoted at $n\ n'$ to the frame E, one arm of each bell-crank lever engaging with one of the clutch-sleeves, while the other arm of each lever is connected to the rod M, which can be operated from the front of the car. By moving the rod in the direction of the arrow, Fig. 1, the clutch L will be thrown into engagement with the hub $l'$, and consequently the worm $h$ will drive the axle D, and the car will be moved at the maximum speed; but if the rod M is moved in the direction opposite that shown by the arrow the clutch K will be thrown into gear and the clutch L out of gear, and consequently the motor will drive the axle C through the medium of the worm $g$ and worm-wheel $k$, and as this axle C is provided with small wheels the speed of the car will be considerably reduced, but the power will to a like extent be increased, so that it is preferable in mounting a grade or starting a heavy load to throw in gear the axle C with its small wheels; but where the load is light or there is no grade to mount, the axle D, with its larger wheels, can be thrown into gear and higher speed obtained.

In the diagram shown in Fig. 3 the wheels c are smaller than the wheels d, and the worm-wheel k is larger than the worm-wheel l on the axle D, and consequently the speed of the axle C is reduced to a still greater extent than in the construction shown in Fig. 2, the power being likewise increased.

In the diagram, Fig. 4, I have shown three pairs of wheels on three axles C, D, and D', the axle D' having the wheels of largest diameter and having the worm-wheel of smallest diameter, the axle C having the wheels c of the smallest diameter and the worm-wheel k of the largest diameter, and the axle D has wheels d and worm-wheel l, of medium diameter, so that it will be seen that three different rates of propulsion of the car can be obtained without changing the speed of the motor.

In Fig. 5 I have shown a motor and motor-shaft for each axle, the shaft being geared to the axle by spur-wheels and the shaft of the motor being parallel with the shafts C D.

By the term "motor-shaft" is not necessarily implied a single shaft common to both or all of the axles, for even if a special motor and motor-shaft is employed for each axle, as shown in Fig. 5, such independent motor-shafts are simply to be regarded as sections of a single motor-shaft, for in practice each shaft when in action would be run at its maximum speed.

Having thus described my invention, I claim and desire to secure by Letters Patent—

1. The combination, in a power-impelled vehicle, of two or more axles, a motor-shaft, and mechanism whereby said shaft may be connected to or disconnected from either axle, the traction-wheels of one axle differing in diameter from those of the other axle or axles, whereby with a constant speed of motor-shaft different rates of propulsion of the vehicle may be maintained, substantially as specified.

2. The combination, in a power-impelled vehicle, of the axles, a single motor-shaft common to all of the axles, and mechanism whereby said shaft may be connected to or disconnected from either of said axles, the traction-wheels of one axle differing in diameter from those of the other axle or axles, whereby with a constant speed of motor-shaft different rates of propulsion of the vehicle may be maintained, substantially as specified.

In testimony whereof I have signed my name to this specification in the presence of two subscribing witnesses.

EDWD. SAMUEL.

Witnesses:
LOUIS KOPPENHOEFER,
HARRY SMITH.